(12) United States Patent
Lyu et al.

(10) Patent No.: US 10,827,480 B2
(45) Date of Patent: Nov. 3, 2020

(54) METHOD FOR TRANSMITTING CONTROL INFORMATION, USER EQUIPMENT, AND NETWORK DEVICE

(71) Applicant: Huawei Technologies Co., Ltd., Shenzhen (CN)

(72) Inventors: Yongxia Lyu, Ottawa (CA); Ruixiang Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/363,768

(22) Filed: Mar. 25, 2019

(65) Prior Publication Data
US 2019/0223165 A1    Jul. 18, 2019

Related U.S. Application Data

(63) Continuation of application No. PCT/CN2017/103847, filed on Sep. 28, 2017.

(30) Foreign Application Priority Data

Sep. 30, 2016 (CN) .......................... 2016 1 0877462

(51) Int. Cl.
*H04W 4/00* (2018.01)
*H04W 72/04* (2009.01)
(Continued)

(52) U.S. Cl.
CPC ......... *H04W 72/042* (2013.01); *H04L 1/0005* (2013.01); *H04L 1/0026* (2013.01);
(Continued)

(58) Field of Classification Search
CPC ... H04W 72/042; H04W 88/02; H04W 24/10; H04W 72/1289; H04L 5/0053;
(Continued)

(56) References Cited

U.S. PATENT DOCUMENTS 9,065,527 B2 * 6/2015 Hoshino ................ H04B 7/155
9,716,578 B2 * 7/2017 Takeda ................ H04B 7/0452
(Continued)

FOREIGN PATENT DOCUMENTS

CN     103517420 A    1/2014
CN     104718715 A    6/2015
(Continued)

OTHER PUBLICATIONS

Huawei, et al., "DCI design for short TTI", 3GPP TSG RAN WG1 Meeting #85, R1-164060, Nanjing, China, May 23-27, 2016, total 15 pages.
(Continued)

*Primary Examiner* — Chuong T Ho
(74) *Attorney, Agent, or Firm* — Slater Matsil, LLP (57) ABSTRACT

A method for transmitting control information, a user equipment and a network device are disclosed. In an embodiment a method for transmitting control information include receiving, by a user equipment, a first part of downlink control information in a downlink control region sent by a network device and receiving, by the user equipment, downlink data and a second part of the downlink control information in a downlink data region based on the first part of the downlink control information, wherein the downlink data and the second part of the downlink control information is sent by the network device.

20 Claims, 5 Drawing Sheets

(51) Int. Cl.
*H04L 5/00* (2006.01)
*H04L 1/00* (2006.01)
*H04L 1/18* (2006.01)
*H04W 24/10* (2009.01)
*H04W 88/02* (2009.01)
*H04W 72/12* (2009.01)

(52) U.S. Cl.
CPC .......... *H04L 1/1819* (2013.01); *H04L 5/0053* (2013.01); *H04L 5/0094* (2013.01); *H04W 24/10* (2013.01); *H04W 88/02* (2013.01); *H04L 1/00* (2013.01); *H04L 1/1896* (2013.01); *H04L 5/0005* (2013.01); *H04L 5/0007* (2013.01); *H04L 5/0044* (2013.01); *H04L 5/0055* (2013.01); *H04W 72/1289* (2013.01)

(58) Field of Classification Search
CPC ... H04L 5/0094; H04L 1/1819; H04L 1/0026; H04L 1/0005; H04L 1/00; H04L 5/0044; H04L 1/1896; H04L 5/0007; H04L 5/0055; H04L 5/0005; H04L 1/1812; H04L 5/003
USPC .................................................. 370/329, 330
See application file for complete search history.

(56) References Cited

U.S. PATENT DOCUMENTS

| | | | | |
|---|---|---|---|---|
| 10,420,088 | B2* | 9/2019 | Ang | H04L 5/0055 |
| 2013/0148623 | A1* | 6/2013 | Nishio | H04L 5/0053 |
| | | | | 370/329 |
| 2014/0133440 | A1* | 5/2014 | Zhang | H04W 72/042 |
| | | | | 370/329 |
| 2015/0092735 | A1 | 4/2015 | Xu | |
| 2015/0163771 | A1 | 6/2015 | Kim et al. | |
| 2015/0230173 | A1* | 8/2015 | Li | H04W 52/0229 |
| | | | | 370/311 |
| 2017/0188340 | A1* | 6/2017 | Andgart | H04W 72/042 |
| 2017/0353947 | A1* | 12/2017 | Ang | A41B 7/06 |
| 2018/0063818 | A1* | 3/2018 | Chen | H04L 5/0053 |
| 2019/0020459 | A1* | 1/2019 | Hooli | H04L 5/0053 |
| 2019/0141700 | A1* | 5/2019 | Kwak | H04L 27/26 |
| 2019/0141733 | A1* | 5/2019 | Kim | H04W 72/0446 |
| 2019/0159191 | A1* | 5/2019 | Kim | H04W 72/14 |

FOREIGN PATENT DOCUMENTS

| | | |
|---|---|---|
| CN | 104782068 A | 7/2015 |
| CN | 104782069 A | 7/2015 |
| WO | 2013013394 A1 | 1/2013 |

OTHER PUBLICATIONS

Motorola Mobility, "Shortened TTI design", 3GPP TSG RAN WG1#86, R1-167628, Gothenburg, Sweden, Aug. 22-26, 2016, total 4 pages.

Nec, "sPDSCH/sPDCCH with 2-symbol sTTI and 1-slot sTTI", 3GPP TSG-RAN WG1 Meeting #86Bis, R1-1609157, Lisbon, Portugal, Oct. 10-14, 2016, total 4 pages.

* cited by examiner

Demodulation reference signal

METHOD FOR TRANSMITTING CONTROL INFORMATION, USER EQUIPMENT, AND NETWORK DEVICE

CROSS-REFERENCE TO RELATED APPLICATIONS

This application is a continuation of International Application No. PCT/CN2017/103847, filed on Sep. 28, 2017, which claims priority to Chinese Patent Application No. 20161087462.0, filed on Sep. 30, 2016. The disclosures of the aforementioned applications are hereby incorporated by reference in their entireties.

TECHNICAL FIELD

This application relates to the communications field, and more specifically, to a method for transmitting control information, user equipment, and a network device.

BACKGROUND

Future 5G communications systems will be committed to supporting higher system performance, specifically supporting more types of services, more different deployment scenarios, and a wider spectral range. The types of services may include an enhanced mobile broadband (eMBB) service, a massive machine type communication (mMTC) service, an ultra-reliable and low latency communications (URLLC) service, a multimedia broadcast multicast service (MBMS), a positioning service, and the like. The different deployment scenarios may include an indoor hotspot scenario, a dense urban scenario, a suburban scenario, an urban macro coverage scenario, a high-speed rail scenario, and the like. The wider spectral range is a spectral range up to 100 GHz that is supported by 5G, includes a low-frequency part below 6 GHz, and a high-frequency part from 6 GHz to 100 GHz.

Compared with a 4G communications systems, one of features of the 5G communications systems is that support on a URLLC service is increased. The URLLC service is widely applied, and typical applications include an application in industrial control, an automation application in an industrial production process, an application in man-machine interaction, an application in telemedicine, and the like. To better quantify a performance index of the URLLC service, and provide reference input and an evaluation criterion for a 5G communications system design, a radio access network (RAN) working group and a RAM working group of the 3rd Generation Partnership Project (3GPP) define performance indexes of the URLLC service from aspects such as a delay, reliability, and a system capacity.

Compared with reliability of a control channel of an existing Long Term Evolution (LTE) system, the URLLC service imposes a higher requirement on reliability of a control channel. In other words, one of the questions to be resolved is how to improve reliability of downlink control information transmission.

SUMMARY

Embodiments provide a method for transmitting control information, a user equipment, and a network device, so as to improve reliability of downlink control information transmission.

According to a first aspect, a method for transmitting control information is provided, including: receiving, by a user equipment in a downlink control region, a first part of downlink control information sent by a network device; and receiving, by the user equipment in a downlink data region based on the first part of the downlink control information, downlink data and a second part of the downlink control information sent by the network device.

According to the method for transmitting control information in the first aspect, the downlink control information is divided into two parts, the first part is transmitted in the downlink control region, and the second part is transmitted in the downlink data region. In this way, a quantity of bits of information transmitted in the downlink control region may be reduced, and reliability of downlink control information transmission can be improved.

According to a second aspect, a method for transmitting control information is provided, including: sending, by a network device, a first part of downlink control information to a user equipment in a downlink control region; and sending, by the network device, downlink data and a second part of the downlink control information to the user equipment in a downlink data region based on the first part of the downlink control information.

According to a third aspect, a user equipment is provided, including a processor, a memory, and a transceiver that are configured to implement corresponding functions of the user equipment in the foregoing aspects.

According to a fourth aspect, a user equipment is provided, including a first receiving module and a second receiving module that are configured to implement corresponding functions of the user equipment in the foregoing aspects. The modules may be implemented by hardware, or may be implemented by hardware executing corresponding software.

According to a fifth aspect, a network device is provided, including a processor, a memory, and a transceiver that are configured to implement corresponding functions of the network device in the foregoing aspects.

According to a sixth aspect, a network device is provided, including a first sending module and a second sending module that are configured to implement corresponding functions of the user equipment in the foregoing aspects. The modules may be implemented by hardware, or may be implemented by hardware executing corresponding software.

In the foregoing aspects, the first part of the downlink control information may include at least one of: time-frequency resource assignment information of the downlink data, new data identifier information of the downlink data, modulation and coding scheme information of the downlink data, transport block size information of the downlink data, hybrid automatic repeat request identifier information of the downlink data, redundancy version information for retransmission of the downlink data, and sending time-frequency resource information of a downlink aperiodic channel quality measurement reference signal.

In the foregoing aspects, the second part of the downlink control information may include at least one of: uplink feedback timing and resource information of the downlink data, power control information of an uplink control channel, resource remapping information of the downlink data, and trigger information of an aperiodic uplink detection signal.

In the foregoing aspects, independent channel coding may be performed on both the downlink data and the second part of the downlink control information, and the downlink data and the second part of the downlink control information are mapped to different time-frequency resources of the downlink data region.

In the foregoing aspects, the second part of the downlink control information may occupy a time-frequency resource of a middle part or an end part of the downlink data region.

In the foregoing aspects, the downlink data and the second part of the downlink control information may share a same demodulation reference signal.

In the foregoing aspects, the second part of the downlink control information may be mapped to a physical resource unit adjacent to a demodulation reference signal in time domain or frequency domain.

In the foregoing aspects, joint channel coding may be performed on the downlink data and the second part of the downlink control information.

DETAILED DESCRIPTION OF ILLUSTRATIVE EMBODIMENTS

The following describes technical solutions of this application with reference to accompanying drawings.

Terminologies such as "component", "module", and "system" used in this specification are used to indicate computer-related entities, hardware, firmware, a combination of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that, the technical solutions of the embodiments of this application may be applied to a Long Term Evolution (LTE) architecture, or may be applied to a Universal Mobile Telecommunications System (UMTS) terrestrial radio access network (UTRAN) architecture, or a Global System for Mobile Communications (GSM)/enhanced data rates for GSM evolution (EDGE) system radio access network (GERAN) architecture. In the UTRAN architecture or the GERAN architecture, an MME function is completed by a serving general packet radio service (GPRS) GPRS support node (SGSN), and an SGW/PGW function is completed by a gateway GPRS support node (GGSN). The technical solutions of the embodiments of this application may also be applied to another communications system, for example, a public land mobile network (PLMN) system, a future 5G communications system, or a communications system later than 5G. This is not limited in the embodiments of this application.

In addition, a next-generation mobile communications system not only supports conventional communication, but also supports machine-to-machine (M2M) communication, which is also referred to as a machine type communication (MTC). The technical solutions of the embodiments of this application may also be applied to an M2M communications system or an MTC communications system.

In the embodiments of this application, a network device is used. The network device may be a device configured to perform communication with a user equipment, for example, may be a base transceiver station (BTS) of a GSM system or a Code Division Multiple Access (CDMA) system, may be a NodeB (NB) in a Wideband Code Division Multiple Access (WCDMA) system, or may be an evolved NodeB (eNB or eNodeB) in an LTE system; or the network device may be a relay node, an access point, an in-vehicle device, a wearable device, a network side device in a future 5G network or a network later than 5G, or a network device in a future evolved PLMN network.

In the embodiments of this application, a user equipment (UE) is also used. The user equipment may be a terminal device, an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless telephone, a Session Initiation Protocol (SIP) phone, a wireless local loop (WLL) station, a personal digital assistant (PDA), a handheld device with a wireless communication function, a computing device, another processing device connected to a wireless modem, an in-vehicle device, a wearable device, a user equipment in a future 5G network or a network later than 5G, or the like. This is not limited in the embodiments of this application.

Figure 1:
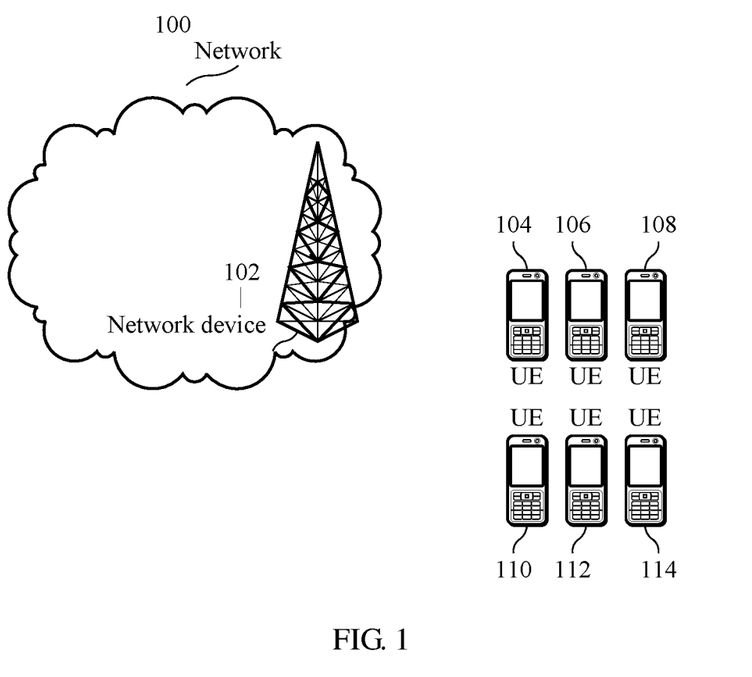
FIG. 1 is a schematic architectural diagram of a communications system to which an embodiment of this application is applied.

FIG. 1 is a schematic architectural diagram of a communications system to which an embodiment of this application is applied. As shown in FIG. 1, the communications system 100 may include a network device 102 and user equipments

104 to 114 (referred to as UE for short in the figure) that are connected in a wireless, wired, or another manner. A network in this embodiment of this application may be any one of the networks listed in the foregoing. It should be understood that, FIG. 1 is an example of a schematic simplified diagram. The network may further include another network device that is not shown in FIG. 1.

The foregoing mentions that a RAN working group and a RAM working group of the 3GPP define performance indexes of a URLLC service from aspects such as a delay, reliability, a system capacity, and the like.

1. Delay: The delay refers to a time required for transmitting a data packet at a user application layer from a service data unit (SDU) of a wireless protocol stack layer 2/3 of a transmit end to an SDU of a wireless protocol stack layer 2/3 of a receive end. Requirements of delays of uplink transmission and downlink transmission on a user plane of the URLLC service are both 0.5 ms, and the requirements are applicable to only a case in which both a base station and UE are not in a discontinuous reception (DRX) state. It should be noted that, the performance requirement of 0.5 ms herein is an average delay of a data packet, and not bounded to the following reliability requirement.

2. Reliability: The reliability refers to a success probability that X bits are transmitted correctly from the transmit end to the receive end within a specific time (for example, L seconds) in a given channel quality condition. The foregoing time is still defined as a time required for transmitting a data packet at the user application layer from the SDU of the wireless protocol stack layer 2/3 of the transmit end to the SDU of the wireless protocol stack layer 2/3 of the receive end. For the URLLC service, a typical requirement is meeting reliability of 99.999% within 1 ms. It should be noted that, the foregoing performance index is only a typical value, and different specific services may have different reliability requirements, for example, during some industrial control having an extremely strict requirement, a transmission success probability of 99.9999999% is required to be achieved within an end-to-end delay of 0.25 ms.

3. A system capacity: The system capacity refers to a maximum cell throughput that a system can reach when a quantity of interrupted users satisfies a specific proportion. An interrupted user is a user for which the system cannot satisfy a reliability requirement in a specific delay range.

A reliability performance index is overall reliability of the URLLC service. To satisfy this requirement, impact of all channels in transmission should be taken into consideration, that is, both a control channel and a data channel should be taken into consideration. The following uses a simple example for description. Downlink data transmission is used as an example, and an error probability of single downlink data transmission may be calculated as follows:

$$P_e = 1 - (1 - P_{PDCSCH})(1 - P_{PDCCH}).$$

$P_{PDCSCH}$ is an error probability of physical downlink control channel (PDCCH) transmission, and $P_{PDCCH}$ is an error probability of physical downlink shared channel (PDSCH) transmission. If a user may improve transmission reliability by using a hybrid automatic repeat request (HARQ), a probability that errors occur after N times of downlink data transmission may be approximately calculated as follows:

$$P_e^N = (1 - (1 - P_{PDCSCH})(1 - P_{PDCCH}))^N.$$

For the convenience of analysis, it is assumed that first transmission and retransmission of data are mutually independent, and a requirement of a PDCCH for reliability is usually one order of magnitude higher than a requirement of a PDSCH for reliability.

Therefore, the requirements of the PDCCH and the PDSCH for reliability may be calculated as follows:

When N=2:

$$P_e = \sqrt{10^{-5}} = 0.3\%, \text{ and}$$

accordingly $P_{PDCCH} = 0.03\%$, and $P_{PDCSCH} = 0.3\%$; and when N=3:

$$P_e = \sqrt[3]{10^{-5}} = 2\%, \text{ and}$$

accordingly $P_{PDCCH} = 0.2\%$, and $P_{PDCSCH} = 2\%$.

Based on the foregoing results, it can be learned that in the URLLC service, a requirement of a user control channel for reliability is higher than a requirement (1%) of a downlink control channel for reliability in an existing LTE system when there are a relatively small quantity of times of retransmission.

There is a plurality of methods for improving reliability of the downlink control channel. For example, more time-frequency resources may be allocated to the downlink control channel, and in this way, an equivalent coding rate of control information may be reduced directly, so as to improve reliability of control information transmission. For another example, multipath diversity transmission may be used, for example, space diversity, frequency diversity, multi-node transmission diversity, or multicarrier transmission diversity.

Figure 2:
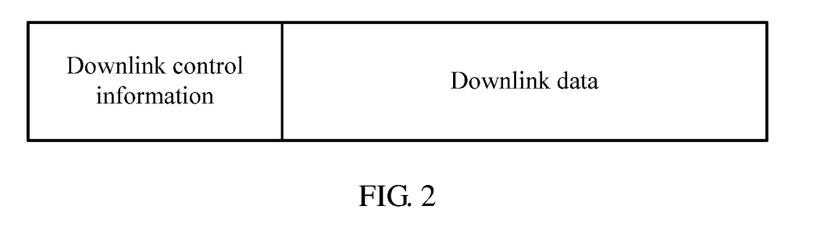
FIG. 2 is a schematic diagram of transmission of downlink control information and downlink data.

Currently, in a scheduling period, or referred to as a scheduling unit, a schematic diagram of transmission of downlink control information and downlink data is shown in FIG. 2. A sending manner of the downlink control information is sending, by a network device, all downlink control information related to a user equipment to the user equipment. The sent downlink control information herein not only includes information related to downlink data reception, such as resource scheduling and a transmission format, but also includes information related to downlink data, such as an uplink feedback time, a resource indication, and power control information, as well as potential uplink or downlink measurement information. There is a relatively large quantity of bits carried by a downlink control channel.

Based on the foregoing problems, an embodiment of this application provides a method for transmitting control information. From a perspective of a network device, the method includes: sending, by the network device, a first part of downlink control information to a user equipment in a downlink control region; and sending, by the network device, downlink data and a second part of the downlink control information to the user equipment in a downlink data region based on the first part of the downlink control information. Correspondingly, from a perspective of a user equipment, the method includes: receiving, by the user equipment in a downlink control region, a first part of downlink control information sent by a network device; and receiving, by the user equipment in a downlink data region based on the first part of the downlink control information, downlink data and a second part of the downlink control information that are sent by the network device.

According to the method for transmitting control information in this embodiment of this application, the downlink control information is divided into two parts, the first part is sent in the downlink control region, and the second part is sent in the downlink data region. In this way, a quantity of bits of information sent in the downlink control region may be reduced, and reliability of downlink control information transmission can be improved.

Herein, the reducing a quantity of bits of information sent in the downlink control region means reducing a quantity of effective bits carried on a downlink control channel. When a time-frequency resource allocated to the downlink control channel is kept unchanged, it is equivalent to reducing an equivalent coding rate of downlink control information, and therefore, reliability of downlink control information transmission can be improved.

Figures 3, 4:
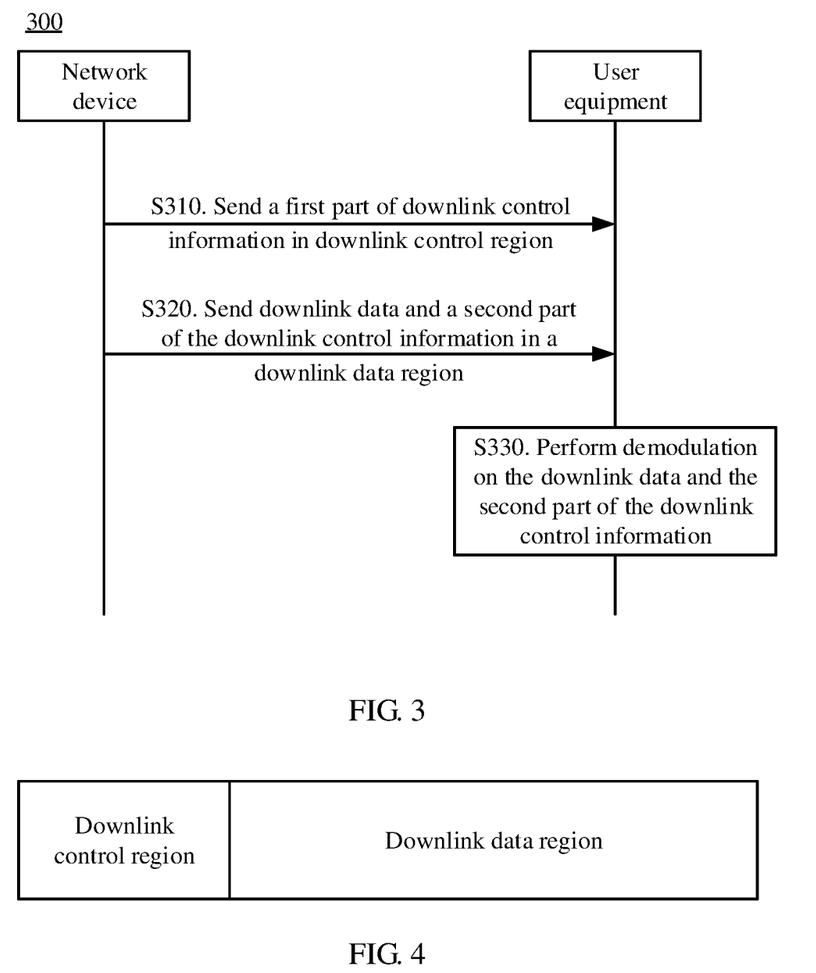
FIG. 3 is a schematic flowchart of a method for transmitting control information according to an embodiment of this application.
FIG. 4 is a schematic diagram of a downlink control region and a downlink data region in a scheduling unit.

Specifically, FIG. 3 is a schematic flowchart of a method 300 for transmitting control information according to an embodiment of this application. The method 300 may include the following steps.

S310. A network device sends a first part of downlink control information to a user equipment in a downlink control region. Correspondingly, the user equipment receives, in the downlink control region, the first part of the downlink control information sent by the network device.

Specifically, the first part of the downlink control information may be a part of downlink control information that is directly related to downlink data reception. The part of downlink control information that is directly related to downlink data reception refers to that the user equipment may start physical layer processing of a downlink data channel based on the part of downlink control information, for example, performing downlink data reception, performing downlink channel estimation, and performing downlink data demodulation. In other words, only a necessary information field is reserved in the first part of the downlink control information, so that a quantity of bits that need to be sent in the necessary information field may be reduced, that is, a quantity of effective bits carried on a downlink control channel may be reduced.

The first part of the downlink control information may include at least one of: time-frequency resource assignment information of the downlink data, which is referred to as resource assignment information of the downlink data for short; new data identifier (new data indicator) information of the downlink data; modulation and coding scheme information of the downlink data; transport block size information of the downlink data; hybrid automatic repeat request identifier (HARQ process ID) information of the downlink data, where a full name of HARQ is Hybrid Automatic Repeat Request; redundancy version information for retransmission of the downlink data; and sending time-frequency resource information of a downlink aperiodic channel quality measurement reference signal. The downlink aperiodic channel quality measurement reference signal may include a downlink aperiodic channel state information reference signal, and may further include some other related signals such as a channel measurement signal and an interference measurement signal. This is not limited in this embodiment of this application.

It should be understood that, a part of the foregoing information may not be necessary in some systems. For example, the hybrid automatic repeat request identifier information of the downlink data may not be necessary in a system that does not support a hybrid automatic repeat request process. In addition, a part of the foregoing information may be specified by the network device and the user equipment according to a protocol, and may also not be transmitted in the downlink control information. For example, modulation mode information of the downlink data may be specified by the network device and the user equipment according to the protocol, and may not be transmitted in the downlink control information. Therefore, not all information in the foregoing information is necessary, and the first part of the downlink control information may include at least one of the foregoing information. The first part of the downlink control information in this embodiment of this application is not limited to the foregoing information, and may also be some information that is directly related to downlink data reception. This is not limited in this embodiment of this application.

FIG. 4 is a schematic diagram of a downlink control region and a downlink data region in a scheduling unit that is also referred to as a scheduling period. As shown in FIG. 4, the downlink control region may be located in a start part of a time-frequency resource of each scheduling period in time domain. For example, one scheduling period is one subframe, and the downlink control region may occupy first several symbols of each subframe.

Figure 5:
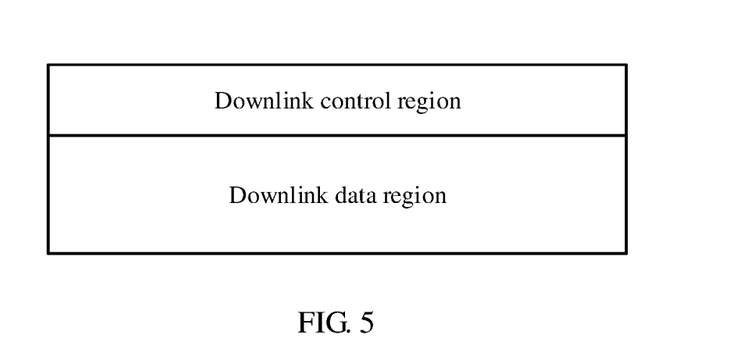
FIG. 5 is a schematic diagram of a downlink control region and a downlink data region in another scheduling unit.

FIG. 5 is a schematic diagram of a downlink control region and a downlink data region in a scheduling unit. As shown in FIG. 5, the downlink control region may be located on a specific subcarrier in a time-frequency resource of each scheduling unit in frequency domain.

S320. The network device sends downlink data and a second part of the downlink control information to the user equipment in a downlink data region based on the first part of the downlink control information. Correspondingly, the user equipment receives, in the downlink data region based on the first part of the downlink control information, the downlink data and the second part of the downlink control information that are sent by the network device.

Specifically, because content of the first part of the downlink control information specifies a parameter directly related to downlink data reception, the network device sends the downlink data and the second part of the downlink control information based on the first part of the downlink control information; and the user equipment receives the downlink data and the second part of the downlink control information based on the first part of the downlink control information.

The second part of the downlink control information may be downlink control information that is not directly related to downlink data reception, to be specific, the user equipment can still perform physical layer processing of a downlink data channel when not receiving the part of downlink control information, for example, perform downlink data reception, downlink channel estimation, and downlink data demodulation.

The second part of the downlink control information includes at least one of: uplink feedback timing and resource (HARQ-ACK feedback timing and resource) information of the downlink data, power control (transmit power control command for UL control channel) information of an uplink control channel, resource remapping (resource assignment adjustment) information of the downlink data, and trigger (request for aperiodic UL sounding resource signal) information of an aperiodic uplink detection signal.

It should be understood that, a part of the foregoing information may not be necessary in some systems, or a part of the foregoing information may be specified by the network device and the user equipment according to a protocol. Therefore, not all information in the foregoing information is necessary, and the second part of the downlink control information may include at least one of the foregoing information. The second part of the downlink control information in this embodiment of this application is not limited to the foregoing information, and may also be some information that is not directly related to downlink data reception. This is not limited in this embodiment of this application.

The downlink data region specifically refers to a time-frequency resource in each scheduling unit (or referred to as a scheduling period) other than a downlink control region, as shown in FIG. 4 and FIG. 5. Specifically, in FIG. 4, a part after the downlink control region is the downlink data region within one scheduling unit. It should be noted that, in a time division duplex (TDD) system, the downlink data region does not include a guard interval and an uplink sending region in a same scheduling unit.

In an embodiment of this application, the network device may perform joint channel coding on the downlink data and the second part of the downlink control information. The network device performs modulation and resource mapping on information obtained after joint channel coding, so as to send processed information to the user equipment. After receiving the information, the user equipment decodes the received information, to obtain both the downlink data and the second part of the downlink control information.

In another embodiment of this application, the network device may perform independent channel coding on both the downlink data and the second part of the downlink control information.

Figure 6:
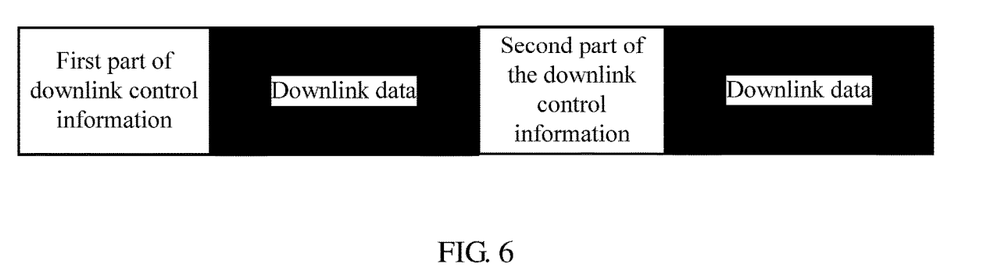
FIG. 6 is a schematic diagram of time-frequency resources occupied by downlink data and all parts of downlink control information according to an embodiment of this application.
Figure 7:
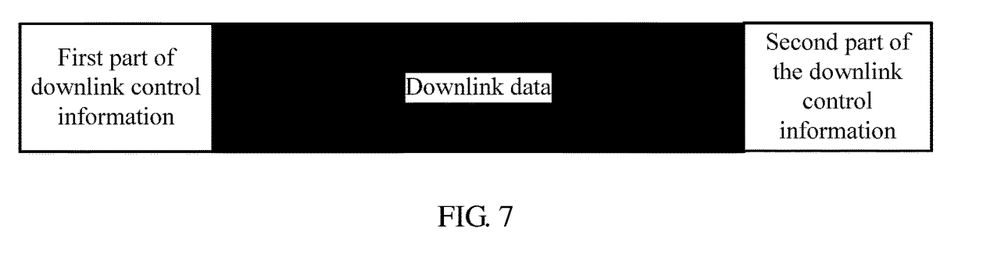
FIG. 7 is a schematic diagram of time-frequency resources occupied by downlink data and all parts of downlink control information according to another embodiment of this application.

Because independent channel coding is performed on the downlink data and the second part of the downlink control information, the downlink data and the second part of the downlink control information are mapped to different time-frequency resources of the downlink data region. Optionally, the second part of the downlink control information may occupy a time-frequency resource of a middle part or an end part of the downlink data region. In other words, the second part of the downlink control information may be mapped to the time-frequency resource of the middle part or the end part of the downlink data region. For example, as shown in FIG. 6, in time domain, a second part of downlink control information occupies a time-frequency resource of a middle part of a downlink data region. For another example, as shown in FIG. 7, in time domain, a second part of downlink control information occupies a time-frequency resource of an end part of a downlink data region. A case in frequency domain is similar to that in time domain, and details are not repeated herein.

Optionally, the downlink data and the second part of the downlink control information share a same demodulation reference signal. In this way, the demodulated reference signal does not need to be sent for each of the downlink data and the second part of the downlink control information, so that resources can be saved, and efficiency of data transmission can be improved. The user equipment may perform data demodulation based on the same demodulation reference signal, to obtain the downlink data and the second part of the downlink control information. Certainly, the downlink data and the second part of the downlink control information in this embodiment of this application may alternatively be based on different demodulation reference signals. This is not limited in this embodiment of this application.

Figure 8:
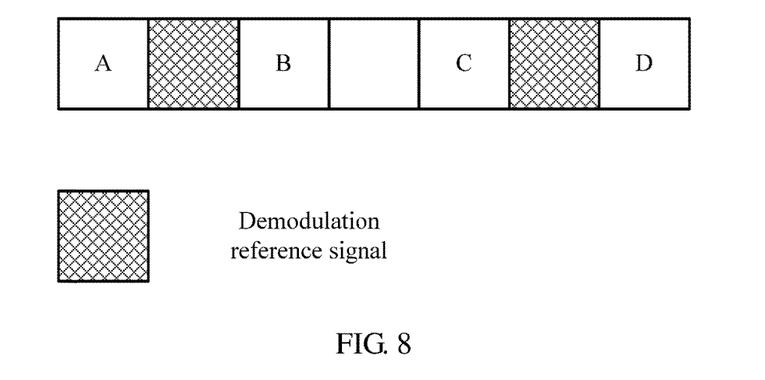
FIG. 8 is a schematic diagram of physical resource units corresponding to a second part of downlink control information according to an embodiment of this application.

Optionally, in an embodiment, the second part of the downlink control information is mapped to a physical resource unit adjacent to a demodulation reference signal in time domain or frequency domain. Specifically, a time domain is used as an example. FIG. 8 is a schematic diagram of physical resource units corresponding to a second part of downlink control information according to an embodiment of this application. In FIG. 8, an example in which one timeslot includes two demodulation reference signals is used. The second part of the downlink control information may be mapped to a physical resource unit adjacent to the demodulation reference signals, for example, a symbol A, a symbol B, a symbol C, or a symbol D. A case in frequency domain is similar, and details are not repeated herein. Because the physical resource unit located at the foregoing location is adjacent to the demodulation reference signal, a channel estimation result of the physical resource unit is more accurate. Mapping the second part of the downlink control information to the physical resource unit can further improve transmission reliability.

S330. The user equipment performs demodulation on the downlink data and the second part of the downlink control information that are received in the downlink data region. When the downlink data and the second part of the downlink control information share a same demodulation reference signal, the user equipment may perform demodulation based on the same demodulation reference signal. For a specific demodulation process, refer to an existing demodulation technology, and details are not repeated herein.

The foregoing describes in detail the method for transmitting a control information according to this embodiment of this application with reference to FIG. 3 to FIG. 8, and the following describes user equipment and a network device according to embodiments of this application with reference to FIG. 9 to FIG. 12.

Figure 9:
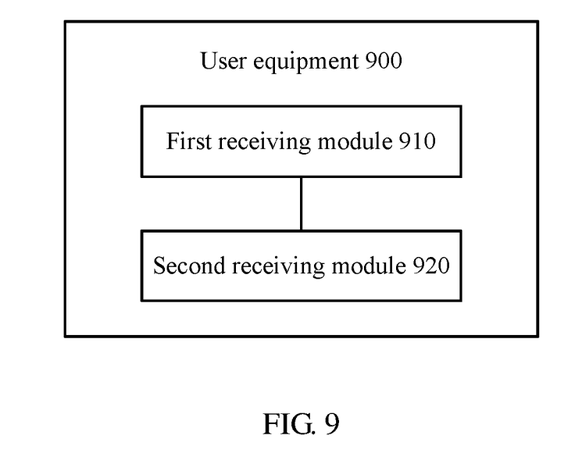
FIG. 9 is a schematic block diagram of a user equipment according to an embodiment of this application.

FIG. 9 is a schematic block diagram of a user equipment 900 according to an embodiment of this application. As shown in FIG. 9, the user equipment 900 may include a first receiving module 910, configured to receive, in a downlink control region, a first part of downlink control information sent by a network device; and a second receiving module 920, configured to receive, in a downlink data region based on the first part of the downlink control information received by the first receiving module 910, downlink data and a second part of the downlink control information that are sent by the network device.

According to the user equipment in this embodiment of this application, the downlink control information is divided into two parts, where the first part is transmitted in the downlink control region, and the second part is transmitted in the downlink data region. In this way, a quantity of bits of information transmitted in the downlink control region may be reduced, and reliability of downlink control information transmission can be improved.

Figure 10:
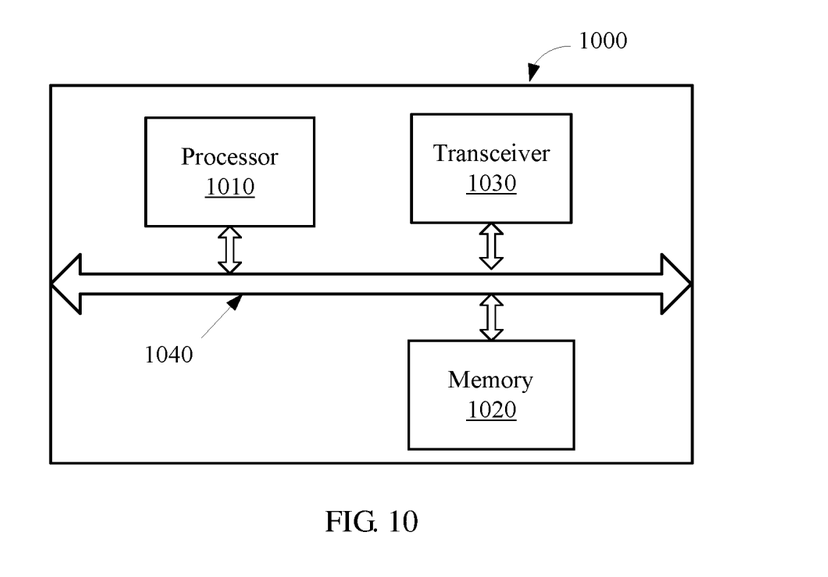
FIG. 10 is a schematic block diagram of a user equipment according to another embodiment of this application.

It should be noted that, in this embodiment of this application, the first receiving module 910 and the second receiving module 920 may be implemented by a transceiver. As shown in FIG. 10, a user equipment 1000 may include a processor 1010, a memory 1020, and a transceiver 1030. The memory 1020 is configured to store an instruction, and the processor 1010 and the transceiver 1030 are configured to execute the instruction stored in the memory 1020, to perform transmission of control information.

Components of the user equipment 1000 are coupled together by using a bus system 1040. In addition to a data bus, the bus system 1040 includes a power bus, a control bus, and a status signal bus.

It should be noted that the foregoing method embodiment of this application may be applied to the processor, or implemented by the processor. The processor may be an integrated circuit chip and has a signal processing capability. In an implementation process, steps in the foregoing method embodiment can be implemented by using a hardware integrated logical circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using/through a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory ( ), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory of the systems and methods described in this specification includes but is not limited to these and any memory of another proper type.

The user equipment 900 shown in FIG. 9 or the user equipment 1000 shown in FIG. 10 can implement the foregoing processes implemented in the embodiments of FIG. 2 to FIG. 8. To avoid repetition, details are not described again.

Figure 11:
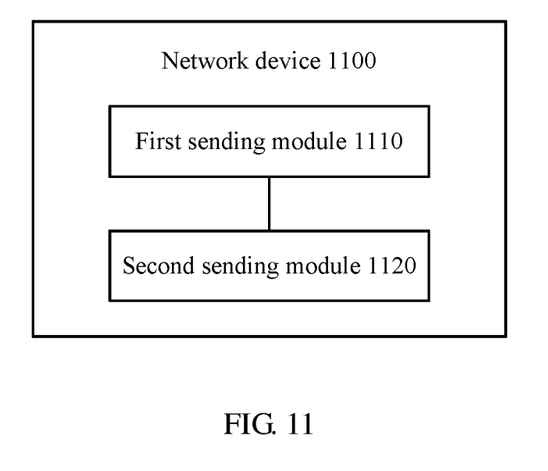
FIG. 11 is a schematic block diagram of a network device according to an embodiment of this application.

FIG. 11 is a schematic block diagram of a user equipment 1100 according to an embodiment of this application. As shown in FIG. 11, the network device 1100 may include a first sending module 1110, configured to send a first part of downlink control information to user equipment in a downlink control region; and a second sending module 1120, configured to send downlink data and a second part of the downlink control information to the user equipment in a downlink data region based on the first part of the downlink control information sent by the first sending module 1110.

According to the network device in this embodiment of this application, the downlink control information is divided into two parts, where the first part is transmitted in the downlink control region, and the second part is transmitted in the downlink data region. In this way, a quantity of bits of information transmitted in the downlink control region may be reduced, and reliability of downlink control information transmission can be improved.

It should be noted that, in this embodiment of this application, the first sending module 1110 and the second sending module 1120 may be implemented by a transceiver.

Figure 12:
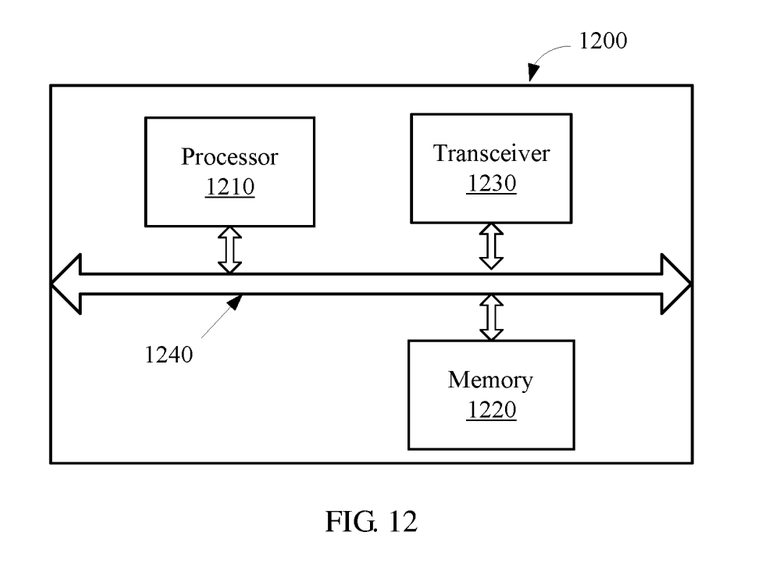
FIG. 12 is a schematic block diagram of a network device according to another embodiment of this application.

As shown in FIG. 12, a network device 1200 may include a processor 1210, a memory 1220, and a transceiver 1230. The memory 1220 is configured to store an instruction, and the processor 1210 and the transceiver 1230 are configured to execute the instruction stored in the memory 1220, to perform transmission of control information.

Components of the network device 1200 are coupled together by using a bus system 1240. In addition to a data bus, the bus system 1240 includes a power bus, a control bus, and a status signal bus.

The network device 1100 shown in FIG. 11 or the network device 1200 shown in FIG. 12 can implement the foregoing processes implemented in the embodiments of FIG. 2 to FIG. 8. To avoid repetition, details are not described again.

According to the user equipments and the network devices shown in FIG. 9 to FIG. 12, optionally, in an embodiment, the first part of the downlink control information includes at least one of: time-frequency resource assignment information of the downlink data, new data identifier information of the downlink data, modulation and coding scheme information of the downlink data, transport block size information of the downlink data, hybrid automatic repeat request identifier information of the downlink data, redundancy version information for retransmission of the downlink data, and sending time-frequency resource information of a downlink aperiodic channel quality measurement reference signal.

Optionally, in an embodiment, the second part of the downlink control information includes at least one of: uplink feedback timing and resource information of the downlink data, power control information of an uplink control channel, resource remapping information of the downlink data, and trigger information of an aperiodic uplink detection signal.

Optionally, in an embodiment, independent channel coding is performed on both the downlink data and the second part of the downlink control information, and the downlink data and the second part of the downlink control information are mapped to different time-frequency resources of the downlink data region.

Optionally, in an embodiment, the second part of the downlink control information occupies a time-frequency resource of a middle part or an end part of the downlink data region.

Optionally, in an embodiment, the downlink data and the second part of the downlink control information share a same demodulation reference signal.

Optionally, in an embodiment, the second part of the downlink control information is mapped to a physical resource unit adjacent to a demodulation reference signal in time domain or frequency domain.

Optionally, in an embodiment, joint channel coding is performed on the downlink data and the second part of the downlink control information.

It should be understood that "an embodiment" or "an embodiment" mentioned in the whole specification means that particular features, structures, or characteristics related to the embodiment are included in at least one embodiment of this application. Therefore, "in an embodiment" or "in an embodiment" appearing throughout the specification does not refer to a same embodiment. In addition, these particular features, structures, or characteristics may be combined in one or more embodiments by using any appropriate manner.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

Methods or steps described in the embodiments disclosed in this specification may be implemented by hardware, a software program executed by a processor, or a combination thereof. The software program may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

This application is described in detail with reference to the accompany drawings and in combination with the example embodiments, but the present invention is not limited thereto. Various equivalent modifications or replacements can be made to the embodiments of this application by a person of ordinary skill in the art without departing from the spirit and essence of this application, and the modifications or replacements shall fall within the scope of this application.

What is claimed is:

1. A method for transmitting control information, the method comprising:
   receiving, by a user equipment, a first part of downlink control information in a downlink control region sent by a network device;
   receiving, by the user equipment, downlink data and a second part of the downlink control information in a data region based on the first part of the downlink control information sent by the network device;
   performing independent channel coding on both the downlink data and the second part of the downlink control information; and
   mapping the downlink data and the second part of the downlink control information to different time-frequency resources of the data region.

2. The method according to claim 1, wherein the first part of the downlink control information comprises at least one of: time-frequency resource assignment information of the downlink data, new data identifier information of the downlink data, modulation and coding scheme information of the downlink data, transport block size information of the downlink data, hybrid automatic repeat request identifier information of the downlink data, redundancy version information for retransmission of the downlink data, or sending time-frequency resource information of a downlink aperiodic channel quality measurement reference signal.

3. The method according to claim 1, wherein the second part of the downlink control information comprises at least one of: uplink feedback timing and resource information of the downlink data, power control information of an uplink control channel, resource remapping information of the downlink data, and trigger information of an aperiodic uplink detection signal.

4. The method according to claim 1, wherein the second part of the downlink control information occupies a time-frequency resource of a middle part or an end part of a downlink data region of the data region.

5. The method according to claim 1, wherein the downlink data and the second part of the downlink control information share the same demodulation reference signal.

6. The method according to claim 1, wherein the second part of the downlink control information is mapped to a physical resource unit adjacent to a demodulation reference signal in a time domain or frequency domain.

7. The method according to claim 1, further comprising joint channel coding on the downlink data and the second part of the downlink control information.

8. The method according to claim 1, wherein the data region is a downlink data region.

9. A method for transmitting control information, the method comprising:
   sending, by a network device, a first part of downlink control information to a user equipment in a downlink control region; and
   sending, by the network device, downlink data and a second part of the downlink control information to the user equipment in a data region based on the first part of the downlink control information,
   wherein independent channel coding is performed on both the downlink data and the second part of the downlink control information, and
   wherein the downlink data and the second part of the downlink control information are mapped to different time-frequency resources of the data region.

10. The method according to claim 9, wherein the first part of the downlink control information comprises at least one of time-frequency resource assignment information of the downlink data, new data identifier information of the downlink data, modulation and coding scheme information of the downlink data, transport block size information of the downlink data, hybrid automatic repeat request identifier information of the downlink data, redundancy version information for retransmission of the downlink data, or sending time-frequency resource information of a downlink aperiodic channel quality measurement reference signal.

11. The method according to claim 9, wherein the second part of the downlink control information comprises at least one of uplink feedback timing and resource information of the downlink data, power control information of an uplink control channel, resource remapping information of the downlink data, or trigger information of an aperiodic uplink detection signal.

12. The method according to claim 9, wherein the second part of the downlink control information occupies a time-frequency resource of a middle part or an end part of a downlink data region of the data region.

13. The method according to claim 9, wherein a joint channel coding is performed on the downlink data and the second part of the downlink control information.

14. The method according to claim 9, wherein the data region is a downlink data region.

15. A user equipment comprising:
a first receiver configured to receive, in a downlink control region, a first part of downlink control information sent by a network device; and
a second receiver configured to receive, in a data region, downlink data and a second part of the downlink control information based on the first part of the downlink control information received by the first receiver sent by the network device,
wherein independent channel coding is performed on both the downlink data and the second part of the downlink control information, and
wherein the downlink data and the second part of the downlink control information are mapped to different time-frequency resources of the data region.

16. The user equipment according to claim 15, wherein the first part of the downlink control information comprises at least one of time-frequency resource assignment information of the downlink data, new data identifier information of the downlink data, modulation and coding scheme information of the downlink data, transport block size information of the downlink data, hybrid automatic repeat request identifier information of the downlink data, redundancy version information for retransmission of the downlink data, or sending time-frequency resource information of a downlink aperiodic channel quality measurement reference signal.

17. The user equipment according to claim 15, wherein the second part of the downlink control information comprises at least one of uplink feedback timing and resource information of the downlink data, power control information of an uplink control channel, resource remapping information of the downlink data, or trigger information of an aperiodic uplink detection signal.

18. The user equipment according to claim 15, wherein the second part of the downlink control information occupies a time-frequency resource of a middle part or an end part of a downlink data region of the data region.

19. The user equipment according to claim 15, wherein joint channel coding is performed on the downlink data and the second part of the downlink control information.

20. The user equipment according to claim 15, wherein the data region is a downlink data region.

* * * * *